(12) United States Patent
Bunn (10) Patent No.: US 10,041,268 B1
(45) Date of Patent: Aug. 7, 2018

(54) UNDERGROUND STORM SHELTER

(71) Applicant: Shelia Bunn, Hampton, AR (US)

(72) Inventor: Shelia Bunn, Hampton, AR (US)

( * ) Notice: Subject to any disclaimer, the term of this patent is extended or adjusted under 35 U.S.C. 154(b) by 0 days.

(21) Appl. No.: 15/622,038

(22) Filed: Jun. 13, 2017

(51) Int. Cl.
*E04H 9/14* (2006.01)
*E04H 9/12* (2006.01)

(52) U.S. Cl.
CPC ...... *E04H 9/14* (2013.01); *E04H 9/12* (2013.01)

(58) Field of Classification Search
CPC ......... E04H 9/14; E04H 9/12; E04B 1/34305; E04B 1/3431
See application file for complete search history.

(56) References Cited

U.S. PATENT DOCUMENTS

| | | | | |
|---|---|---|---|---|
| 2,827,004 A * | 3/1958 | Luce | | E04H 9/10 109/1 S |
| 4,534,144 A * | 8/1985 | Gustafsson | | E04H 9/12 52/167.1 |
| 6,061,976 A | 5/2000 | Willbanks, Jr. | | |
| 6,427,630 B1 | 8/2002 | Oehler, Jr. | | |
| 8,176,692 B2 * | 5/2012 | Crow | | E04H 9/14 52/169.6 |
| 8,549,797 B1 | 10/2013 | Ricketts | | |
| 8,621,787 B2 * | 1/2014 | Barry | | E04B 1/34869 52/220.1 |
| 8,695,285 B2 * | 4/2014 | Reinmann, Jr. | | E04H 9/16 299/12 |
| 8,756,869 B1 * | 6/2014 | Routt | | E04H 9/08 292/95 |
| 9,856,670 B1 * | 1/2018 | Kraft | | E04H 9/14 |
| 2006/0254160 A1 * | 11/2006 | Lee | | E04B 1/34305 52/67 |
| 2006/0254166 A1 * | 11/2006 | Michels | | E04H 9/14 52/270 |
| 2007/0251159 A1 * | 11/2007 | Wagner | | E04H 9/145 52/19 |
| 2011/0179721 A1 * | 7/2011 | Barry | | E04H 1/005 52/79.1 |
| 2011/0277398 A1 * | 11/2011 | Crow | | E04H 9/14 52/169.6 |
| 2012/0180403 A1 * | 7/2012 | Kull | | E04B 1/34321 52/79.1 |
| 2013/0008095 A1 * | 1/2013 | Hoover | | E04H 9/14 52/79.8 |
| 2013/0091783 A1 * | 4/2013 | Reinmann, Jr. | | A62B 31/00 52/79.5 |
| 2014/0259976 A1 * | 9/2014 | Bowers | | E04H 9/14 52/79.5 |
| 2014/0366462 A1 * | 12/2014 | Richardson | | E04H 9/12 52/169.6 |

* cited by examiner

*Primary Examiner* — Rodney Mintz
(74) *Attorney, Agent, or Firm* — Rashauna Norment (57) ABSTRACT

The invention is an improved underground storm shelter that has a downwardly tapered rear end, a removable front wall having a slidable door, an interior chamber for an occupant to take shelter, a ventilation system for ventilating and providing air circulation within the chamber of the shelter, and an anchoring means for anchoring the shelter to the ground. The storm shelter is lightweight for transport and installation, but sturdy during inclement weather because of the anchoring system.

13 Claims, 14 Drawing Sheets

UNDERGROUND STORM SHELTER

CROSS-REFERENCE TO RELATED APPLICATIONS

Not applicable.

FEDERALLY SPONSORED RESEARCH AND DEVELOPMENT

Not applicable.

BACKGROUND OF THE INVENTION

1. Field of the Invention

The present invention generally relates to an underground storm shelter that is at least partially covered by the earth, soil, or other materials. More particularly, the invention relates to an underground storm shelter having a body with at least a tapered anchoring end, a ventilation system, and a door, with at least a portion of the shelter being covered by the earth, soil, or other materials.

2. Description of Arguably Related Art Including Information Disclosed for 37 CFR 1.97 and 1.98

Storm shelters are often used to protect people and animals during emergencies or during severe inclement weather. During severe weather, for example, during a tornado or a severe thunderstorm, it may be critical to a person's safety and survival to have a dependable, accessible, and strong place of temporary shelter. Conventionally, storm shelters may be provided as above-ground temporary shelters. Alternatively, some storm shelters may be positioned either partially or completely underground or underneath another structure, for instance, a house or a mobile home. The storm shelter may be attached or connected directly to the house. Alternatively the storm shelter may be a free-standing shelter.

An underground shelter is a desirable shelter for a person to utilize against high winds and debris that may otherwise cause damage to an above-ground shelter or other freestanding structure. These shelters may be anchored to the ground or at least partially covered by soil or other materials. Many of these underground storm shelters are expensive and difficult to manufacture, ship, and install at the user's property. Many underground storm shelters require excavation to dig into the earth.

U.S. Pat. No. 4,534,144 issued to Gustafsson et al. discloses an underground storage cellar having a cylindrical body with lengthwise stiffening members. The body has a substantially flat roof or top. The body has separate sections that are interconnected by sealed joints. The shelter also has at least one outwardly opening door. The shelter is partly buried in the ground and covered by insulating material, particularly soil. It also discloses a ventilation system that has an air evacuation outlet, multiple air inlets, and a manually operated fan for air circulation. When external conditions are appropriate, air circulation may be achieved through the doors.

U.S. Pat. No. 6,061,976 issued to Willbanks, Jr. discloses a protective shelter that is installed at least partly in the surrounding earth. The sidewalls of the body of the shelter are slanted outwardly to create a flared bottom region that assists in retaining the body in the installed location with the surrounding earth. The front of the shelter is slanted, with a door leading to a slanted stairwell and into the body of the shelter. The body has a substantially flat roof or top.

None of the references disclose, teach, or suggest an underground storm shelter for one or more occupants, with the storm shelter having a downwardly tapering body; a removable front end wall having a slidable door, with the front end wall connectable to the body with a fastening mechanism; and an anchoring means having at least two flaps, a plurality of anchor members, and soil, wherein each flap defines a plurality of bores for receiving one of the anchor members before the soil is placed over at least the tapered end of the storm shelter.

A need exists for an underground storm shelter that is prefabricated, portable, and lightweight, with a water-tight seal, yet the structure remains sturdy enough to withstand high winds and debris.

A need exists for an underground storm shelter that has a body with at least one section of the top having a sloped roof with the shelter further having a tapered or downwardly declining rear end; the shelter also includes a door, a ventilation system, and an anchoring means for anchoring the structure using soil or other materials to cover at least the tapered end of the structure.

A need exists for an underground storm shelter that can be installed in a field or at any other location whereby the shelter can be easily and quickly accessed during an emergency.

SUMMARY OF THE INVENTION

In general, the present invention is a storm shelter that may be installed and positioned as an underground storm shelter. The shelter may be partially or completely covered by soil or other materials, with entry to the doorway remaining uncovered. The doorway is preferably located at the front wall of the structure; however, the door may be located in any other suitable location. The shelter may be installed next to, in, or within a hill. Alternatively, the storm shelter may be installed beneath, next to, within, or near another structure, for example, a house or an event center.

In one embodiment, the invention is an underground storm shelter comprising (including or having) a body having a front end wall, two opposing side walls, at least a partially sloped or tapered roof or top, a downwardly tapered rear end, and an anchoring means, wherein the body has an interior chamber, with front end wall having a slidable door, wherein the door further comprising a ventilation system and an a viewing member.

In another embodiment, the invention is an underground storm shelter comprising a body having one or more connectable segments, with at least one segment being a front segment, a middle segment, and a rear segment, wherein the body forms an interior chamber, and the rear segment forming a downwardly tapered end; with the front segment having a door, wherein the door further includes a ventilation system; and an anchoring means for anchoring the shelter.

The shelter is inexpensive to manufacture and ship due to the lightweight materials used to form the shelter. In one embodiment, the shelter's structure is collapsible and foldable. In another embodiment, the shelter's structure is one or more removably interlocking segments that are stackable when not in use. Also in this embodiment, the length of the body of the shelter is extendable by installing additional modular segments to the structure. The shelter is easily accessible during and after a weather emergency through an upstanding slidable door. With its aerodynamic configured or contoured body and its anchoring means, the shelter remains anchored to the ground during high winds and flying debris.

For each embodiment, the door is preferably located at the front end wall and is slidably opened or closed. In another embodiment, the door may be located on a slide wall, or on the roof or top of the shelter.

It is an object of the invention to provide an underground storm shelter that is portable, durable, and cost effective.

It is an object of the invention to provide and underground storm shelter that has a tapered or tail end for supporting an anchoring means.

It is another object of the invention to provide an underground storm shelter that has a slide-able door raised off the ground for easy and quick access.

It is an object of the invention to provide a storm shelter that can be placed on the ground, within a trench, or under a mobile home.

These and other aspects, objects, embodiments, and advantages of the invention will become apparent from the accompanying drawing and the following detailed description of the preferred embodiments of the invention.

BRIEF DESCRIPTION OF THE SEVERAL VIEWS OF THE DRAWING

The invention may be more readily described by reference to the accompanying drawing figures and the following description of the drawing figures. The reference numbers apply to each embodiment of the invention. In the drawing.

The front and rear elevation plan views for the second embodiment are essentially identical to the views of FIGS. 3 and 4, and therefore, are not depicted.

DETAILED DESCRIPTION OF THE INVENTION

The present invention, preferred embodiments of the invention, and the accompanying drawing figures as described herein should not be construed as limited to the illustrated drawing. Rather the illustrated embodiment(s) are detailed to provide a thorough disclosure suitable to convey the scope of the invention to those skilled in the art. For the sake of simplicity, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

Referring more particularly to the drawing by characters of reference, the FIGS. 1-17 depict an underground storm shelter 1 comprising (including or having) a body having a front end wall 2, two side walls 2, a sloped top or roof 4 with a downwardly tapering rear portion of a rear end wall 5, a floor 6, a ventilation system (not shown), and an anchoring means for anchoring the shelter to the ground or another structure, with the front end wall 2 having a raised opening (or step or ledge) and a slidable door 7.

The body of the shelter may be made from materials that are lightweight, durable, and water-resistant. In one embodiment, the material forming the body is a polyethylene plastic or a polyethylene plastic blend. The body's structure may be approximately 4 to 6 inches depth to withstand inclement weather conditions. In one embodiment, the shelter is approximately a 7 foot width, an 8 foot height, and a 15 foot length. Alternatively, the size of the shelter may be smaller or larger to accommodate the individual user's occupancy needs. In a preferred embodiment, the shelter has a height of six feet or less. The size of the shelter can be customized to accommodate the anticipated number of occupants.

Figure 16:
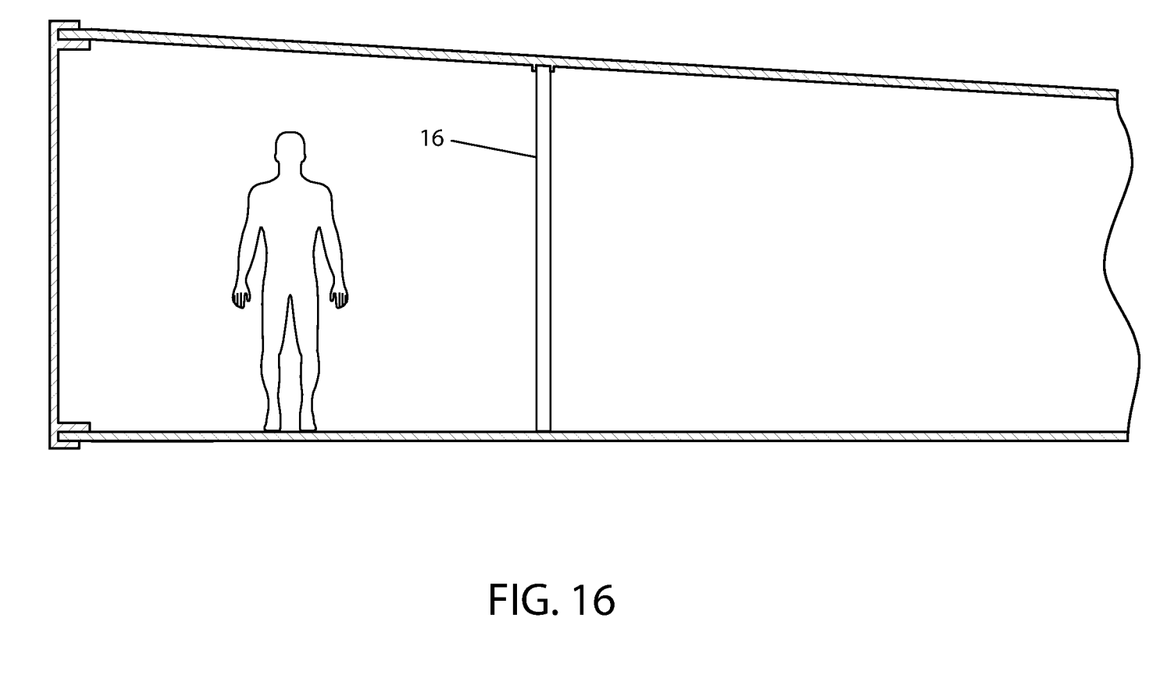
FIG. 16 is a cutaway or interior view showing the interior chamber of the storm shelter of FIG. 1.
Figure 17:
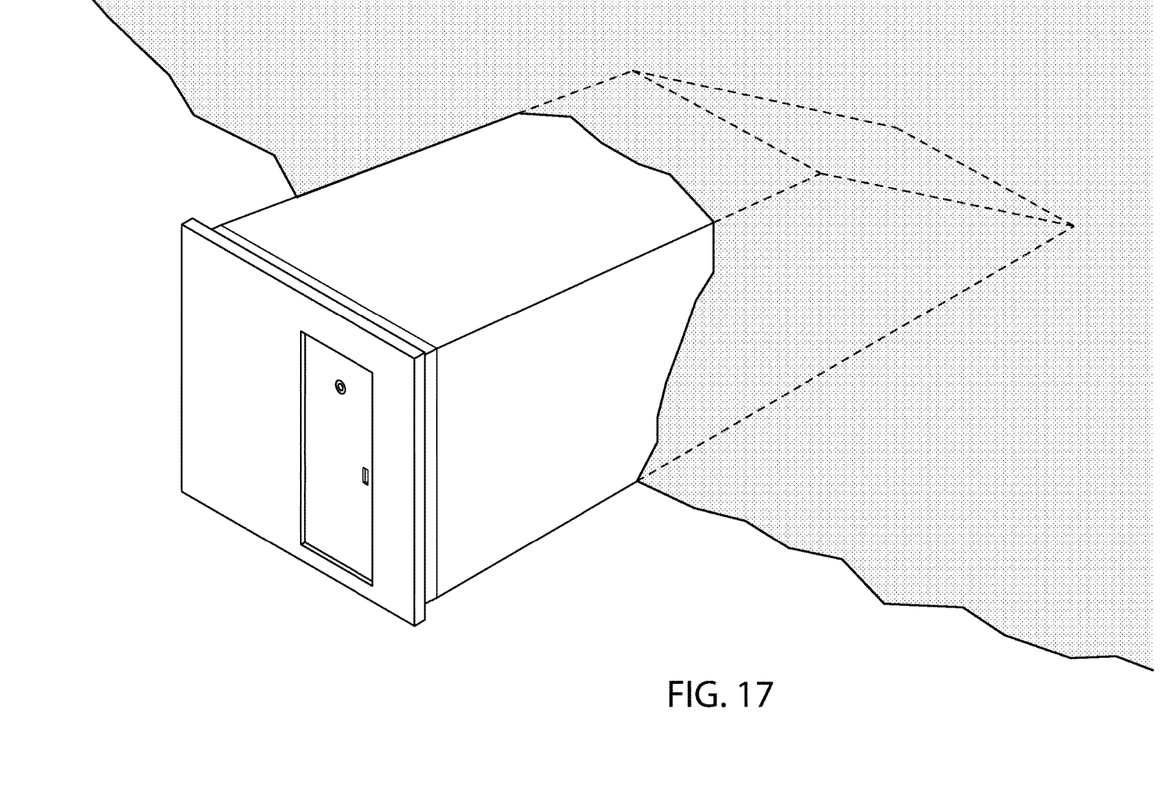
FIG. 17 is a perspective view of FIG. 1, showing the storm shelter in use, with soil covering from the tapered rear end to approximately halfway over the roof of the storm shelter.
Figure 18:
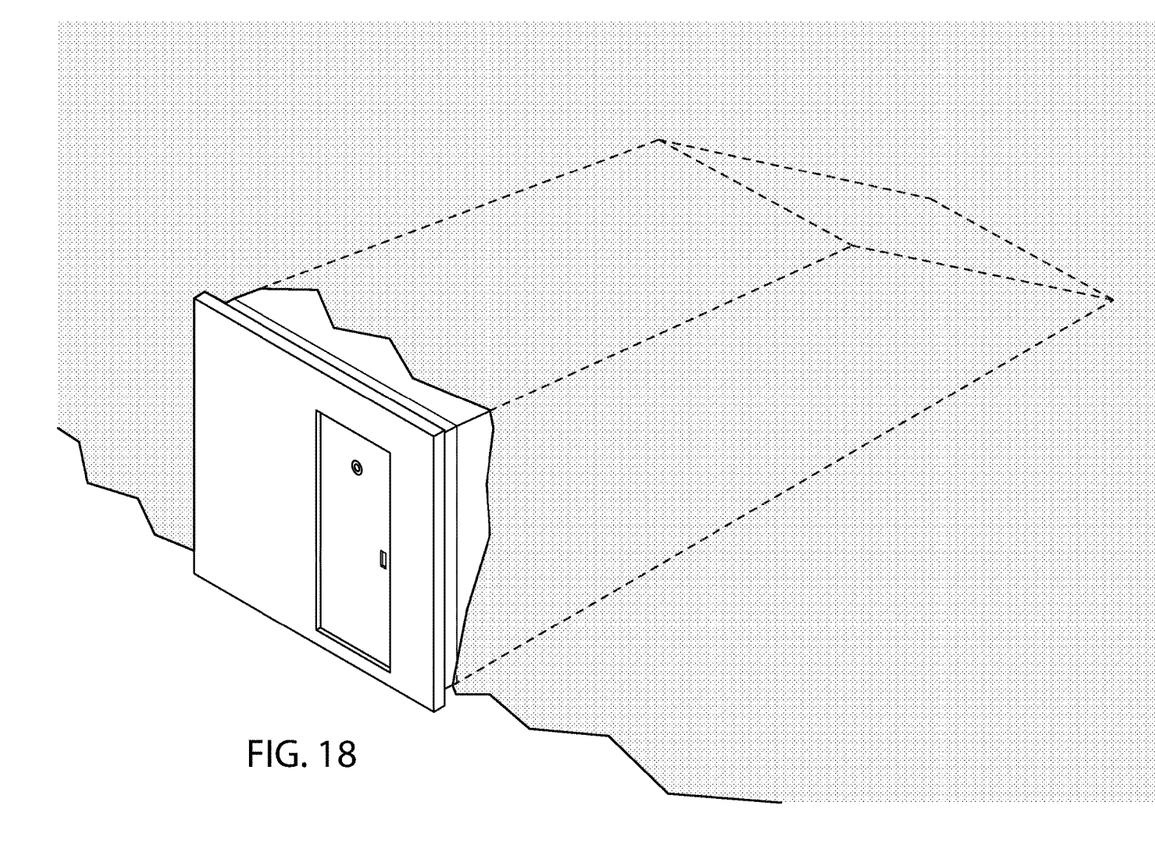
FIG. 18 is another perspective view of FIG. 1, showing the storm shelter in use, with soil covering from the tapered rear end up to the front end wall.

As shown in FIGS. 16-17, the body of the shelter may be completely buried under the soil, preferably except for the entrance to the shelter. Alternatively, the body, and more particularly, the tapered rear portion may be the only part of the shelter that is covered with soil or other materials. The body of the shelter has a front end wall, two opposing side walls, a top or roof, a floor, and a downwardly tapered rear end wall. All of the walls form an interior chamber or holding location for one or more users to wait out a storm. The body may be configured into a sloped structure, with the distal portion of the body tapering to a shallow end point.

As shown in FIGS. 1, 2-3, 5-12, and 17, the front end wall 2 is essentially an upstanding end wall defining a raised door opening, with the lower portion of the door opening forming a step. The raised door opening also aids in preventing flooding. The front end wall 2 also includes a slidable door 7. The floor is also raised at or to substantially the threshold of the door opening. In one embodiment, the front end wall 2 is affixed to the top 4 and the two side walls 3 of the body so that the front end wall is a unitary part of the shelter body.

In another embodiment, the front wall is removably fastened to the top and the two side walls with the fastening mechanism 10, namely a snap seal fastener, as described in the embodiment for the shelter segments. The substantially upstanding front end wall allows easy access to the interior chamber of the structure. The depth of the front wall of the body should be thick enough to withstand weight or force pressed against it, such as falling debris. The depth of the front wall should also be thick enough to accommodate receiving the sliding door when the door is a pocket-type sliding door. When the door is a slidable pocket-type door, the front end wall further includes an elongated channel therein to receive the door.

A shelter having a slidable door is beneficial during high wind conditions when trying to close access to the shelter. During high wind conditions, an outwardly or inwardly hinged door may be difficult or even dangerous to properly close. If the door opens outwardly or inwardly, debris could block the movement of the door, or debris or high winds could breech the barrier of the door. In one embodiment, the interior of the front end wall further has a track mechanism to which the door is slidably mounted. The track mechanism (not shown) may include a rail member, at least one slidable roller member, and a fastener for removably mounting the door to the track mechanism. The door 7 may be secured into a closed position with a locking mechanism 9. The locking mechanism may include a deadbolt and locking handle. The door further may include a seal (not shown) that surrounds the door or the doorway opening to prevent leaking. The door 7 may further include a viewing member 8 for the user to safely check the exterior area before opening the door. The viewing member may be a window, peephole, or other outlook. This window or peephole is made from shatter resistant material or other impact resistant material.

Figure 1:
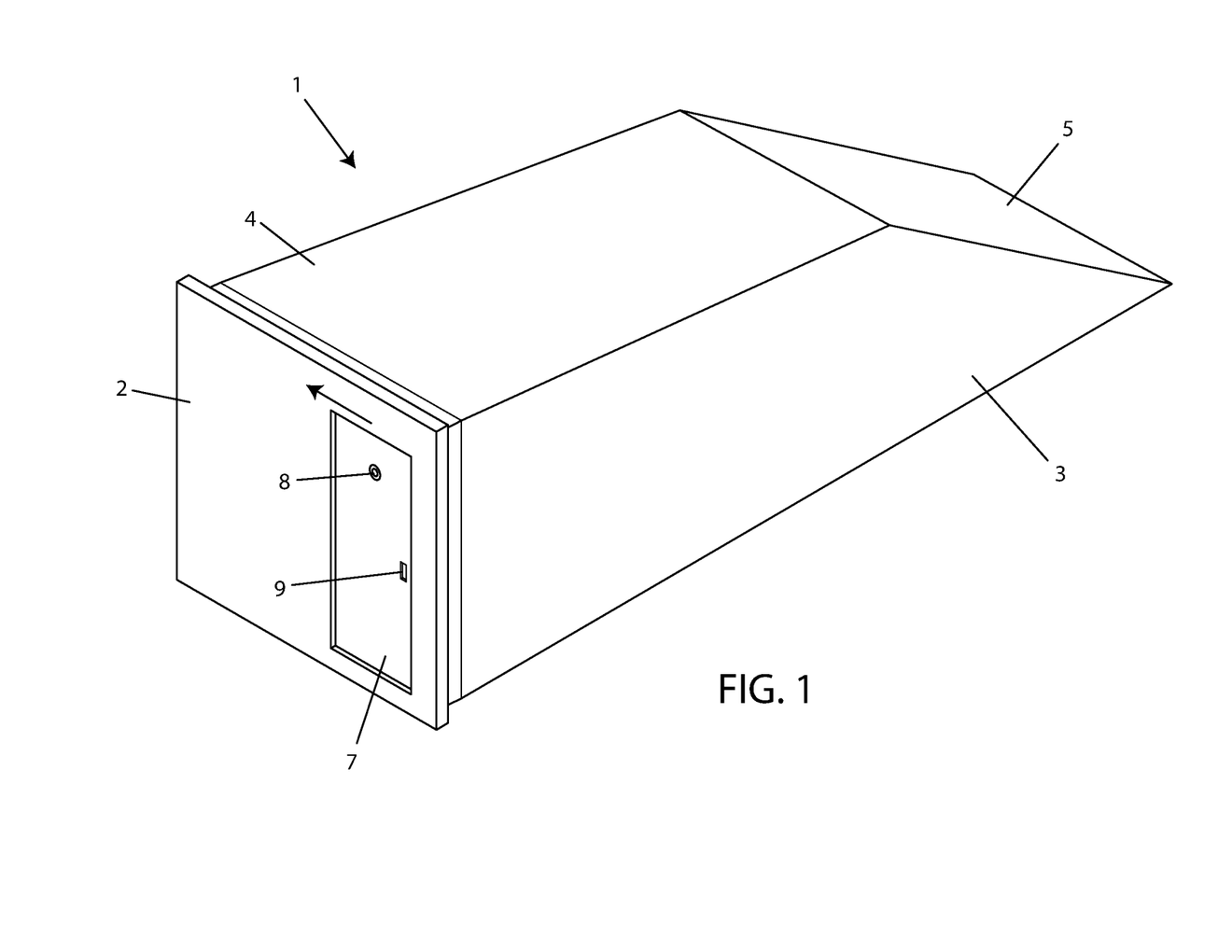
FIG. 1 is a perspective view of an embodiment of an underground storm shelter.
Figure 2:
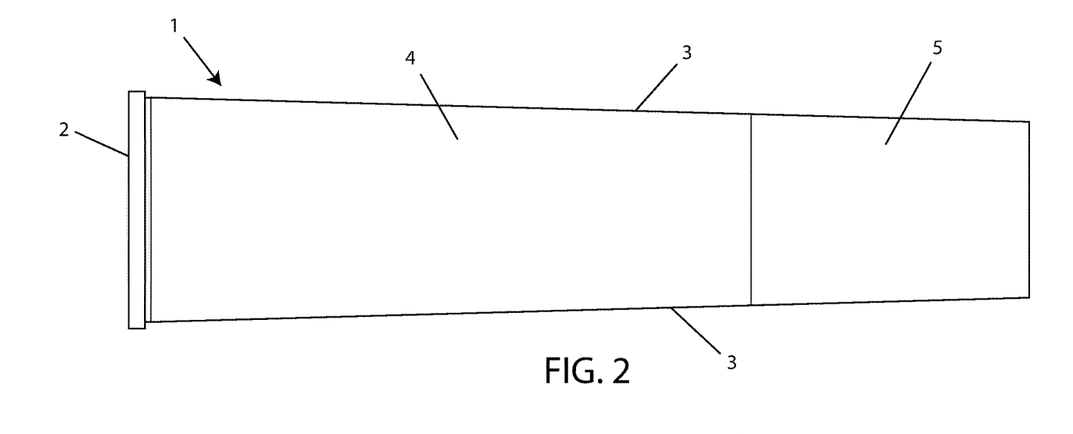
FIG. 2 is a top plan view of FIG. 1 thereof.
Figure 3:
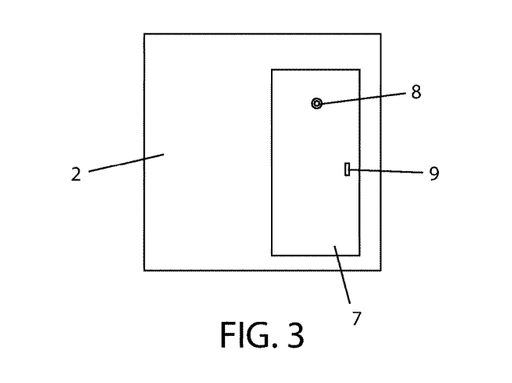
FIG. 3 is a front elevation plan view of FIG. 1 thereof.
Figure 4:
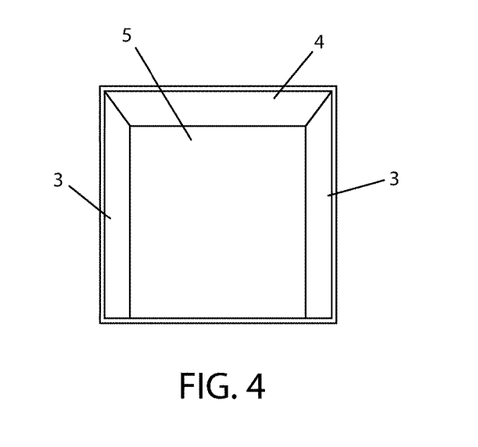
FIG. 4 is a rear elevation plan view of FIG. 1 thereof.
Figure 5:
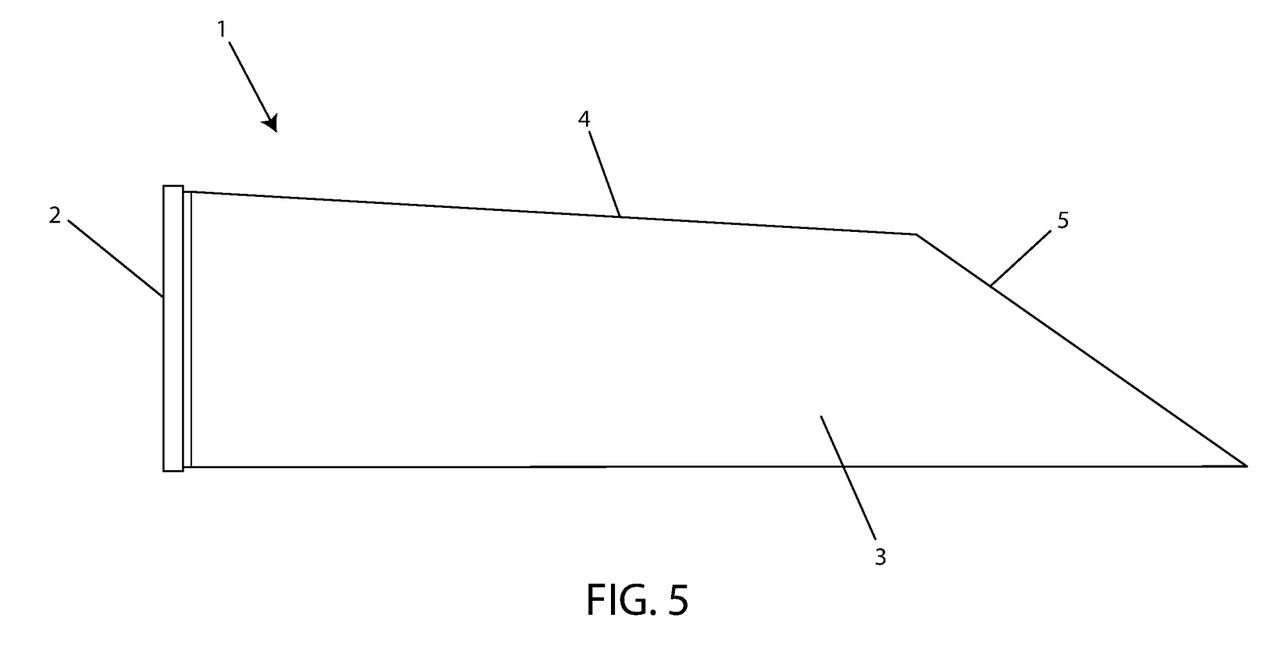
FIG. 5 is a right side elevation view of FIG. 1 thereof, with the left side elevation view being a mirror image.
Figure 6:
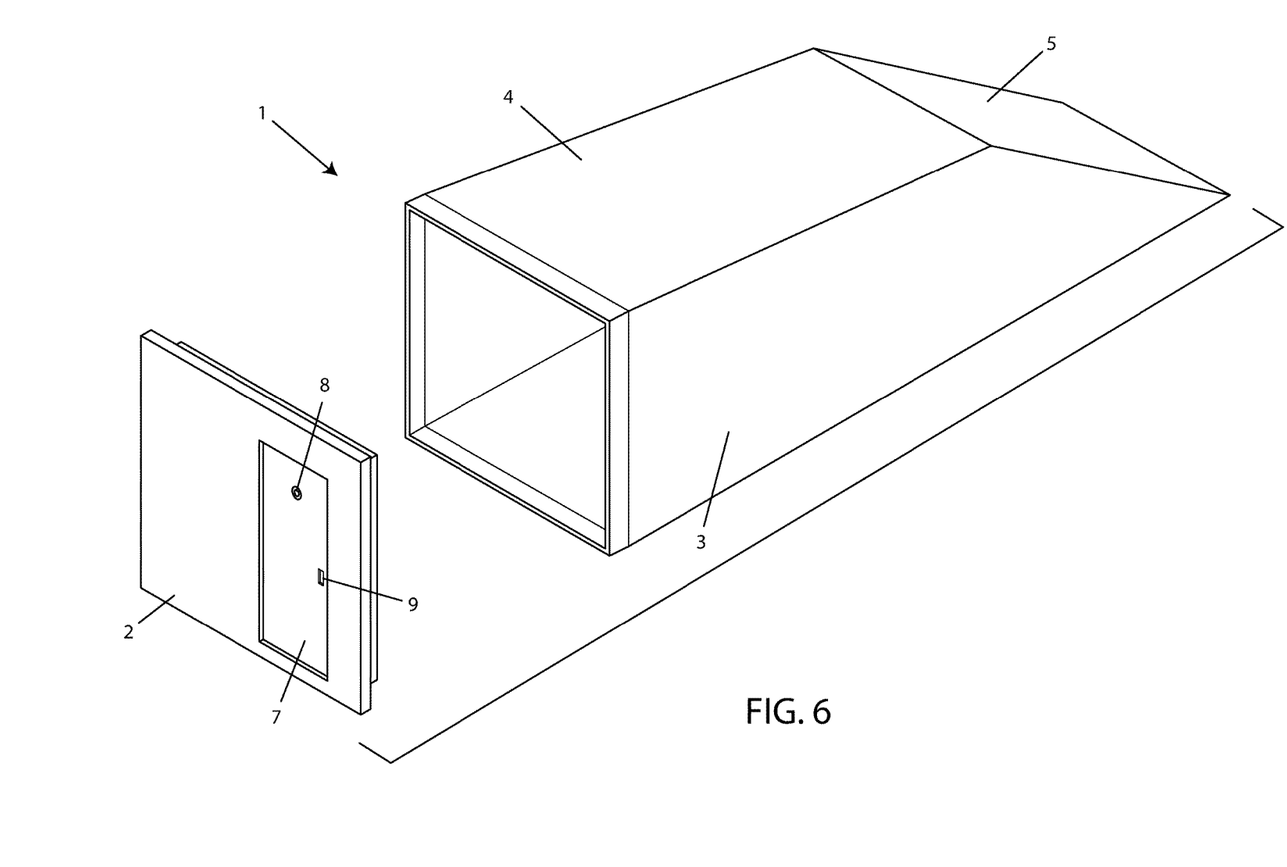
FIG. 6 is another perspective view of FIG. 1 thereof; showing the front end wall separated from the body of the shelter.
Figure 7:
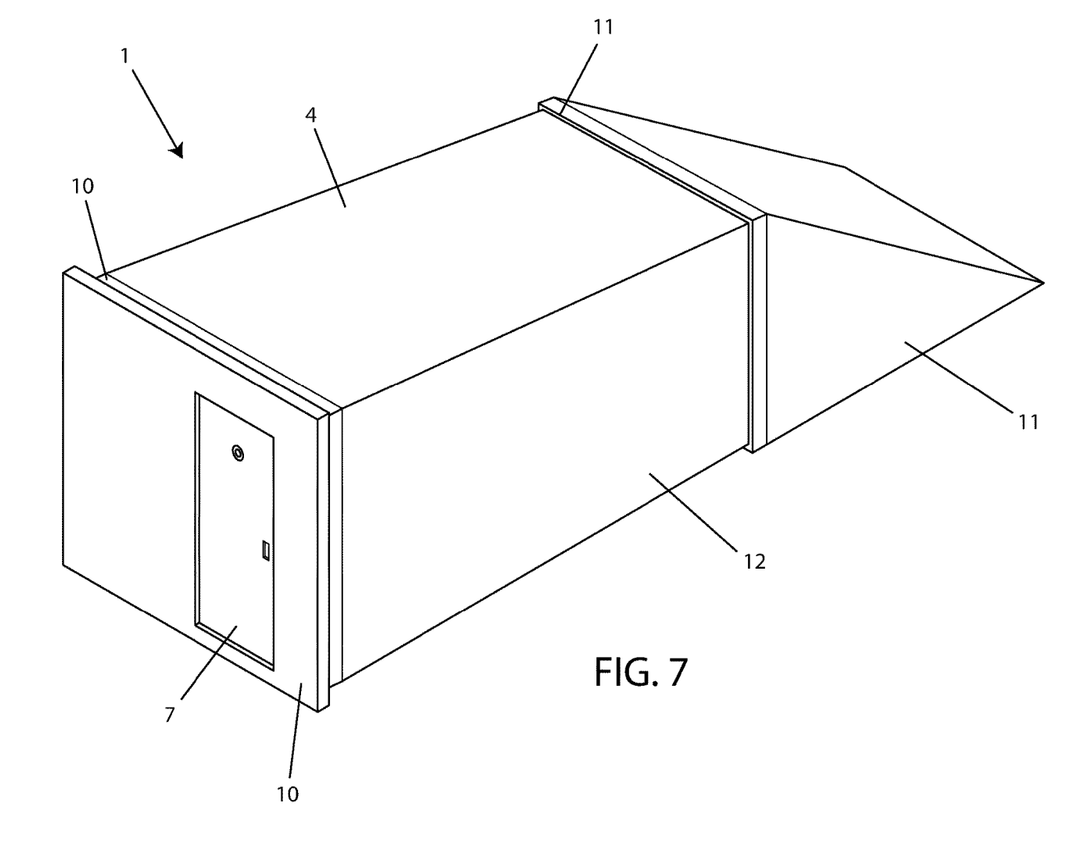
FIG. 7 is a perspective view of another embodiment of FIG. 1, showing the storm shelter having a front segment, a middle segment, and a rear segment, as shown in an assembled configuration.
Figure 8:
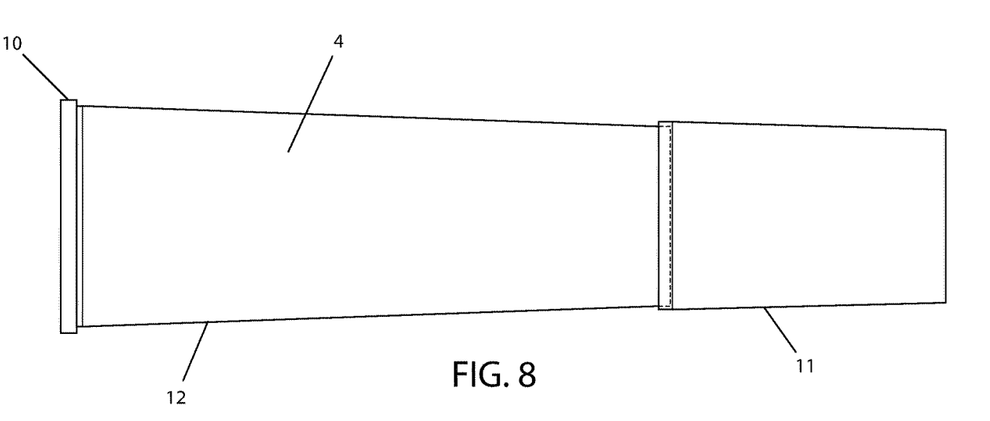
FIG. 8 is a top plan view of FIG. 7 thereof, showing insertion of the middle segment into the rear segment of the shelter.
Figure 9:
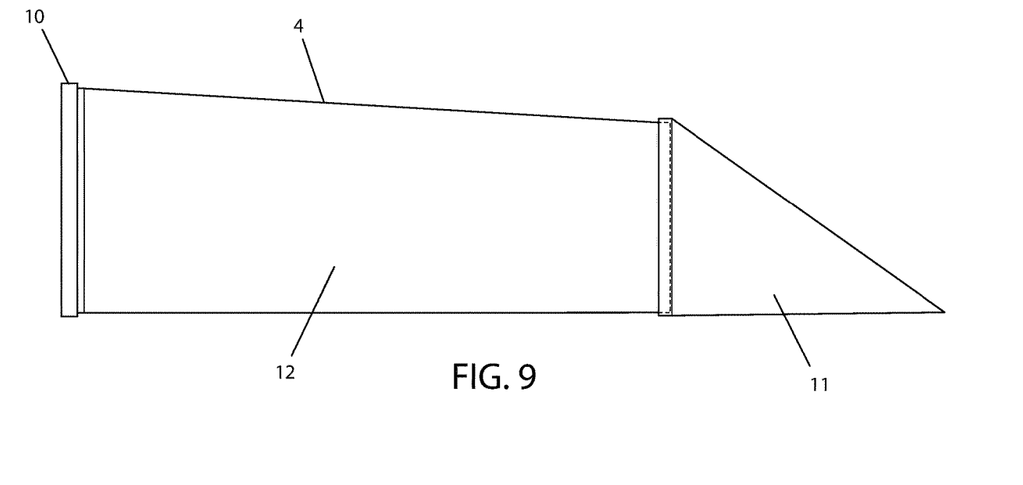
FIG. 9 is a right side elevation view of FIG. 7 thereof, with the left side elevation view being a mirror image.
Figure 10:
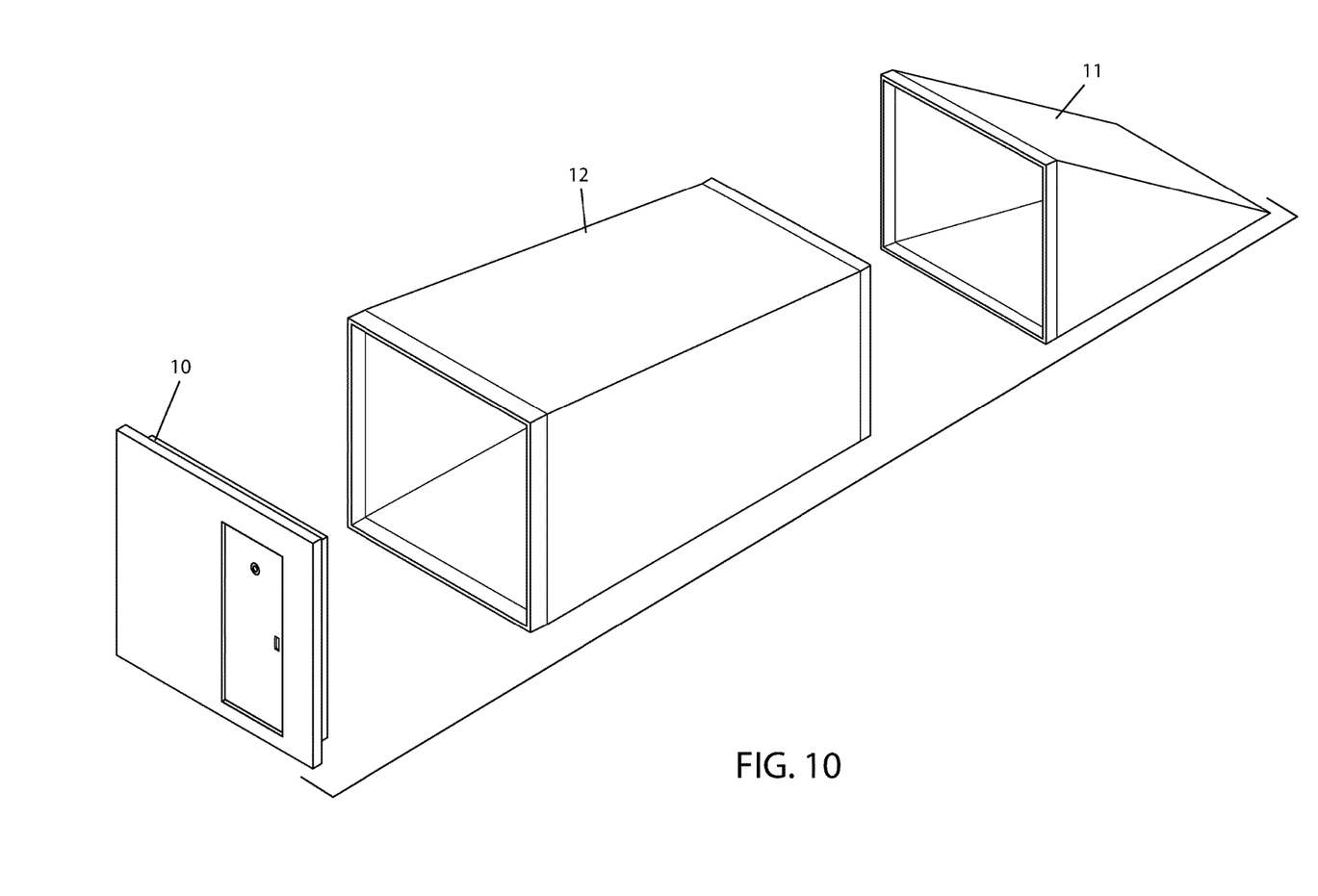
FIG. 10 is a perspective view of FIG. 7, showing the segmented shelter in a disassembled configuration.
Figure 11:
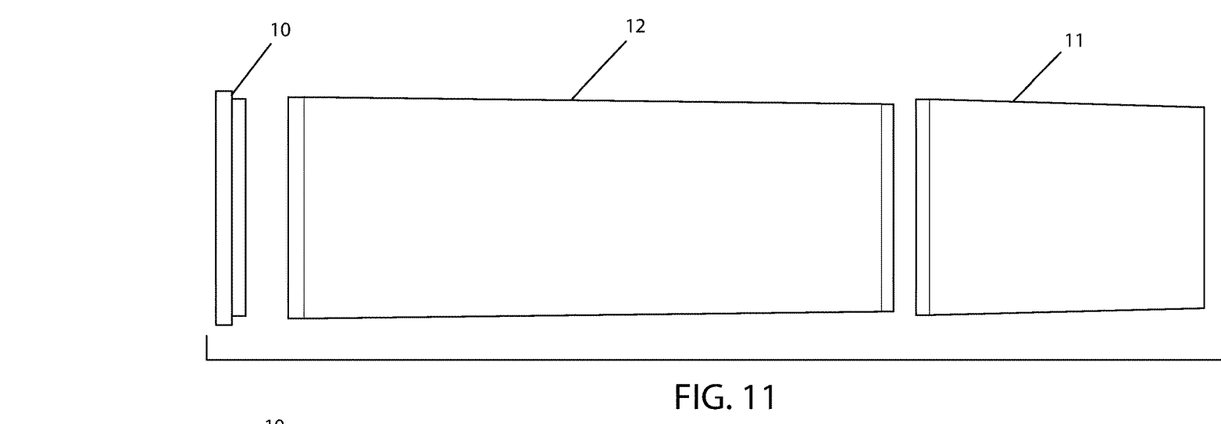
FIG. 11 is a top plan view of FIG. 10 thereof.
Figure 12:
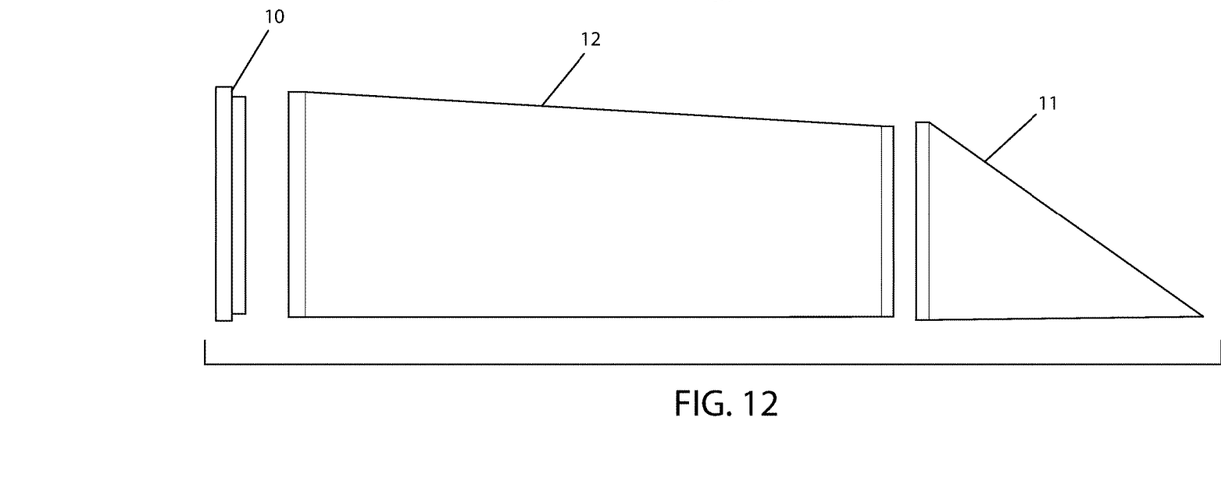
FIG. 12 is a right side elevation view of FIG. 10 thereof, with left side elevation being a mirror image.

As shown in FIG. 1, the top 4 of the shelter is preferably gradually sloped from the proximal front or first portion of the shelter to a declining downward taper toward the distal rear portion of the shelter. The top is permanently affixed or integrated to the body of the shelter. Alternatively, the top 4 may be removably attached to the side walls 3 and front end wall 2 and secured with the snap seal fastening mechanism 10. The addition of soil over the shelter forms an aerodynamic, contoured, slightly rounded combined structure. Each of the side walls are substantially upstanding walls. The forward or proximal portion of each upper side wall near the front wall has a height higher than the remainder of the length of each side wall. The gradual slope starting at the proximal portion to the distal portion of each upper side wall increases the taper to merge with the side walls and the top of the shelter with the rear wall. The depth is approximately two feet. The height or depth of the rear wall's downwardly tapered region depends on the height of the overall body of the shelter.

The interior chamber of the body is substantially hollow and may be sized to hold one or more occupants. Before or during a storm, one or more occupants may enter into the shelter's chamber and secure the door behind them. The body may further include a support assembly for additional structural support. The support assembly may include one or a plurality of support members 16 removably positioned within the chamber. For example as shown in FIG. 16, at least one support member may be secured into the central area of the chamber. Other support members may be secured near or at the corners of the chamber. In one embodiment, each support member is a sturdy elongated component that is positioned at the recommended support points. The support members may be a pole or a beam, for example, a 4×4 vertical beam. The interior of the shelter may further include one or more recesses (not shown) against which the support member abuts. The shelter may further include a floor. The floor may be affixed to or may be integrated into the lower portion of the body of the shelter. The floor also aids in the body staying straightened.

In the embodiment shown in FIGS. 7-12 wherein the body of the shelter is segmented, the body has a front segment 2, one or more middle segments 12, and a rear segment 11. The front segment is the proximal portion of the shelter. The front segment 2 has the upstanding front end wall, the door 7, and a fastening mechanism 10. The middle segment 12 has the side walls 3, the top 4, the bottom or floor of the shelter, and the fastening mechanism 10. The length of the body may be extended by adding one or more middle segments to the structure. The rear segment 11 is the distal portion of the shelter. The rear segment has the tapered end of the shelter. The fastening mechanism for each of the segments in this embodiment is preferably a snap seal fastener. The snap seal fastener has a lip 10 circumscribing the opening of the front segment and the distal second opening of the middle segment. The lip connectably inserts and fastens over the proximal opening of the middle segment and the rear segment opening. The snap seal fastener may further include a plurality of clips (not shown) for securing the lip to the receiving opening.

The shelter may also include an illumination means (not shown). The illumination means may have one or more lights that are battery powered, solar powered, or electrically powered. The interior may further include storage and shelving which may by affixed or mounted to the interior side walls or the floor, or otherwise placed or positioned within the shelter. The interior may also include seating. The interior components, namely, the storage, shelving, and seating, are features that may be added after the shelter is delivered, unstacked, and installed at the desired location. The interior components are removed during transport to accommodate the insertable slidable stacking of the shelters.

Figure 13:
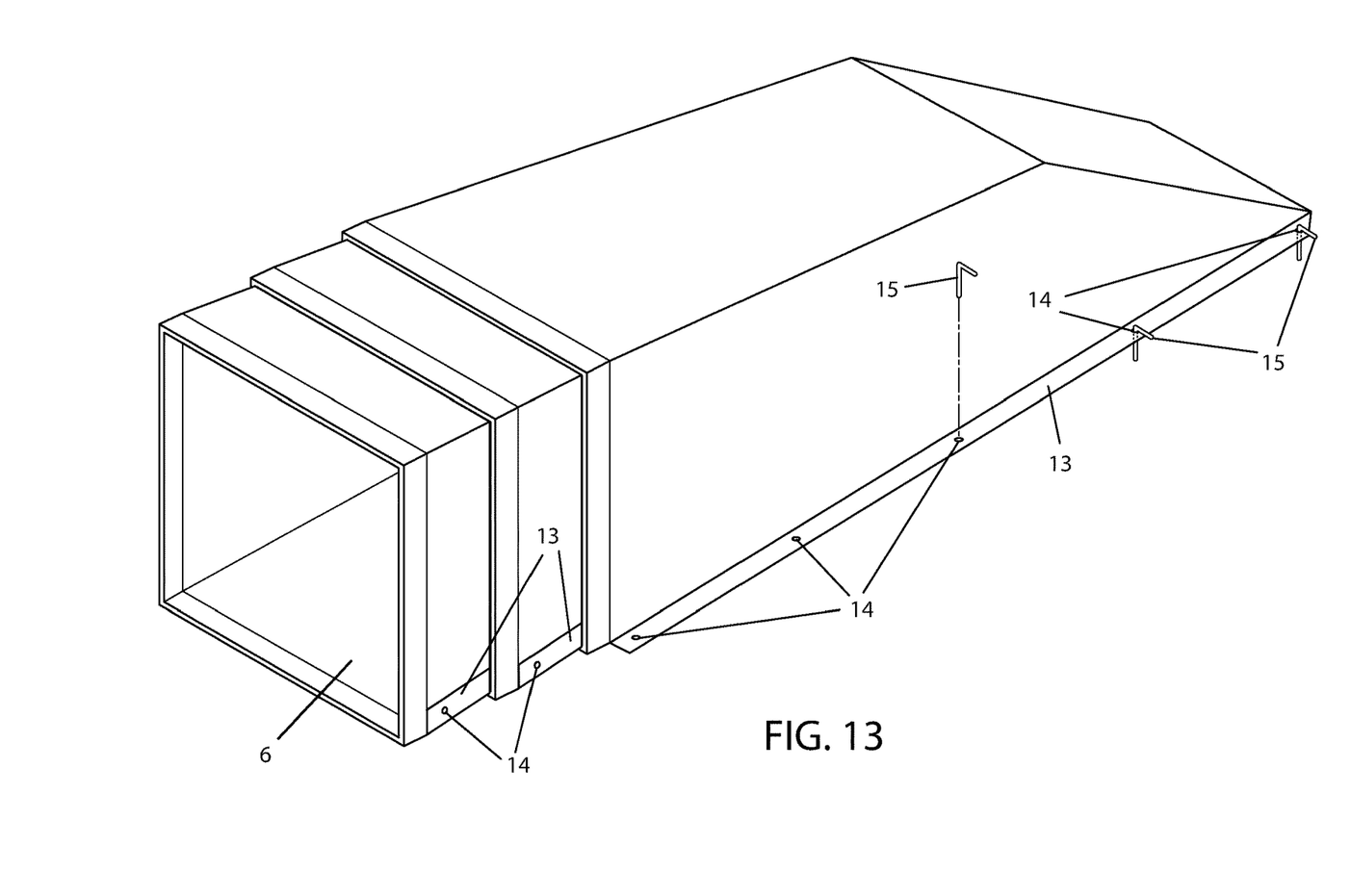
FIG. 13 is a perspective view of embodiment of FIG. 1, showing a plurality of storm shelters slidably stacked therein, with the front end walls removed for the insertion.
Figure 14:
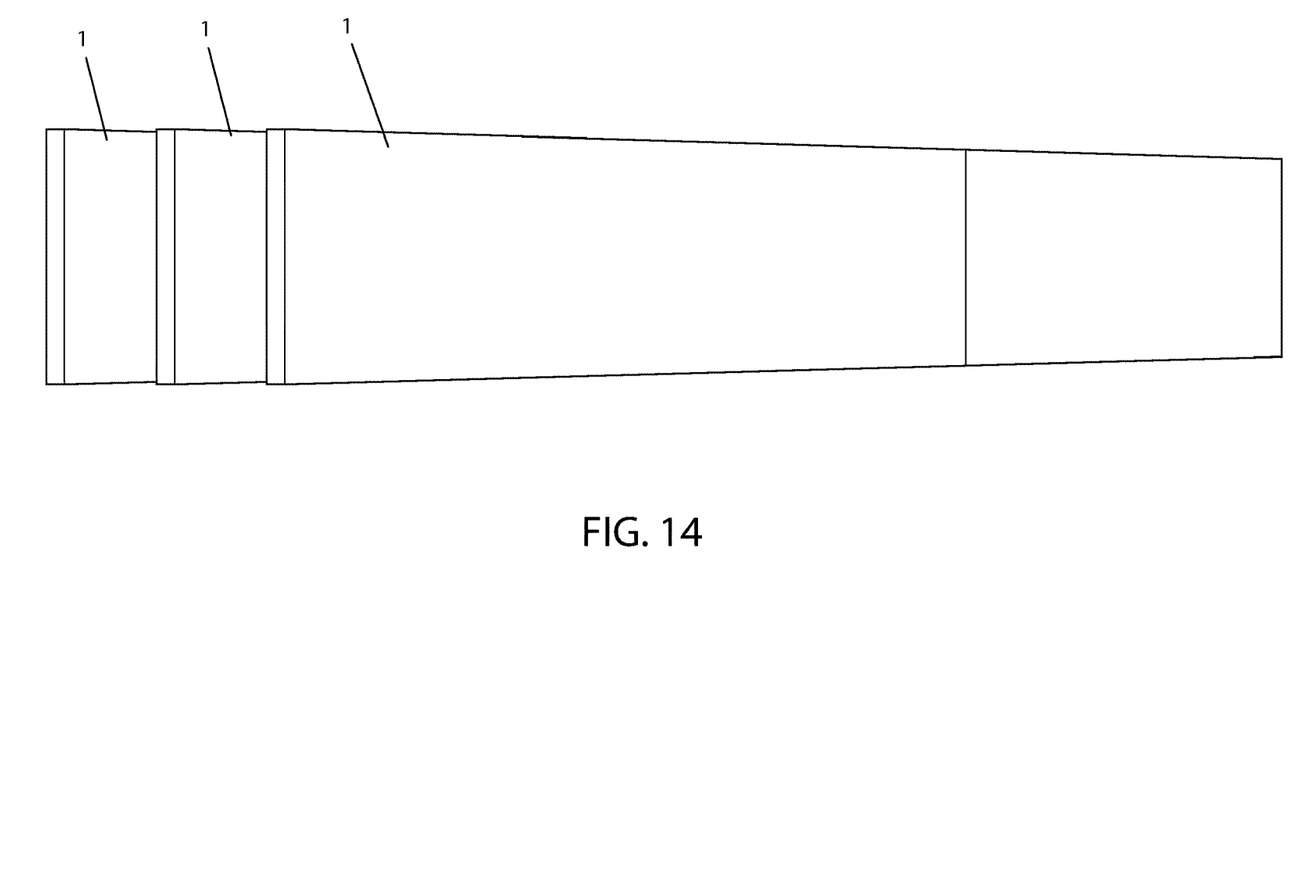
FIG. 14 is a top plan view of FIG. 13 thereof.
Figure 15:
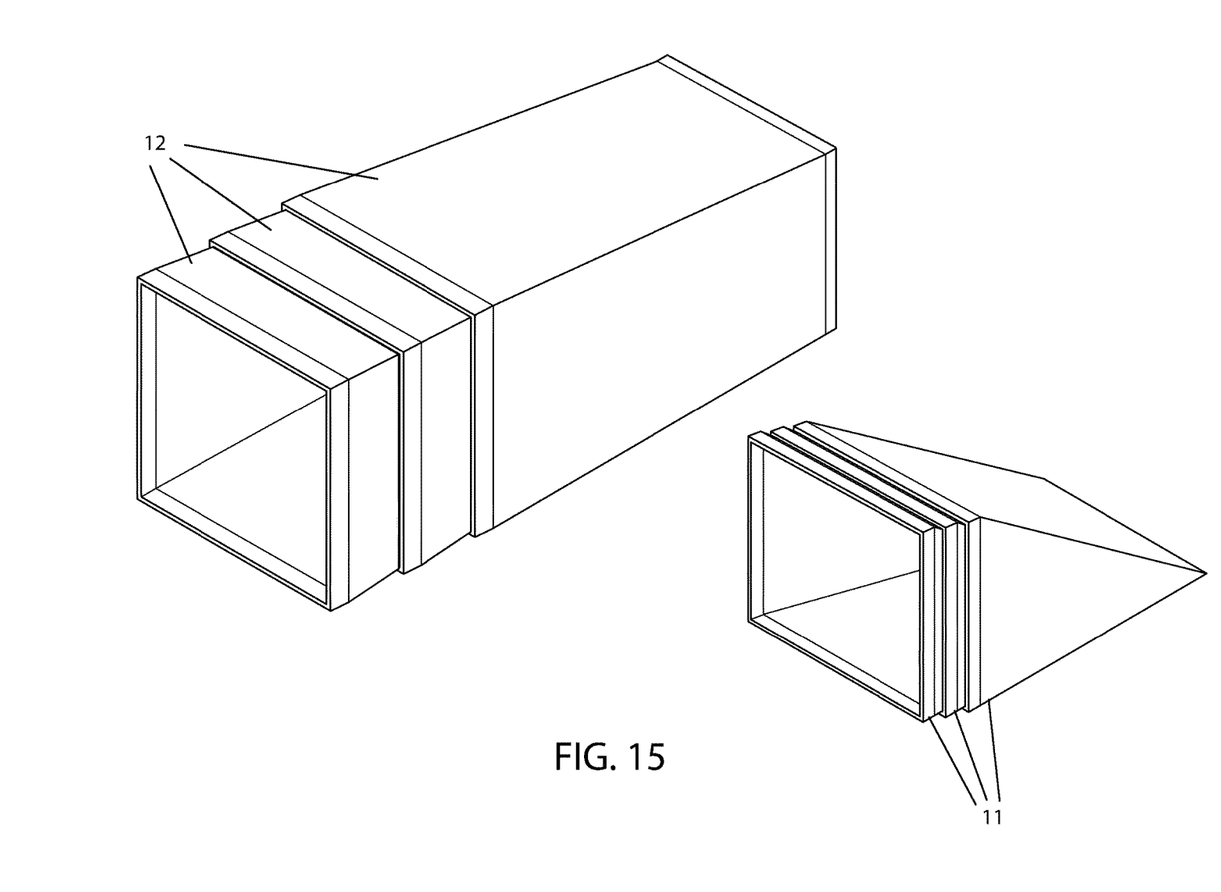
FIG. 15 is a perspective view of FIG. 10, showing a plurality of middle segments of the shelter being insertably stacked therein, and a plurality of rear segments being insertably stacked therein, as shown in a disassembled configuration.

The anchoring means anchors the shelter to the ground or to any other structure. The anchoring means preferably anchors at least the tapered end of the shelter. In one embodiment as shown in FIG. 13, the anchoring means is soil, earth, or any other material that is placed, positioned, or otherwise layered over at least the lower part of the tapered end of the shelter. Approximately two to three feet (or more) of soil is placed on at least the rearmost portion of the tapered end of the shelter, preferably at least one foot from the end of the taper of the shelter. The weight of the soil facilitates keeping the shelter in place during high winds.

In another embodiment as shown in FIG. 13, the anchoring means has at least two anchor members 15 and at least two flaps 13, with each of the flaps 13 located at the lower section of each of the side walls 3. The anchor members 15 may be stakes, spikes, or any other anchors for securing the shelter to the ground or other structure. Each flap 13 defines at least one bore 14 for receiving a respective anchor member 15. Each flap 13 preferably has a plurality of bores 14 defined along the length of the flap. The flap preferably unfolds from an upright position to a lateral position. A single flap may extend the length of the one side of the body of shelter as shown in FIG. 13. Alternatively, a plurality of flap segments may be used (not shown), with each of the flap segments defining a bore for receiving an anchor member. Having flaps that fold upwardly against the side walls of the shelter allows the shelter to be insertably stacked during transport or storage. After the shelter is placed in the desired location, the flaps are lowered or otherwise bent or fanned outwardly to abut the ground or other structure. The inner side of each flap may be affixed to or otherwise extend from the respective side wall or the outer lateral ends of the floor of the shelter. The anchor members are inserted through the flap bores and secured.

Preferably, the anchoring means has two flaps, a plurality of anchor members, and soil. Each flap defines a plurality of bores. Each flap is moved from an upright position to a lateral position. Each anchor member 15 is inserted through, or otherwise driven through, each respective flap 13 bore 14 and the ground or other structure, with the anchor member being fastenable or otherwise secured to the ground. Next, soil is placed over at least the tapered end of the shelter body and over the flaps. The weight of the soil on the tail on the body prevents the structure from inadvertently rising upwardly during the storm. The anchor members provide additional protection in the event that the weight or amount of the soil is compromised.

In another embodiment, the anchoring means has a plurality of anchor members, with the floor of the shelter defining a plurality of bores for receiving the respective anchor members. Soil may also be added on top of at least the tapered end of the shelter for further support.

The ventilation system (not shown) provides air circulation through the interior of the shelter. The ventilation system may include a plurality of vents, hoses, air conduits, or tubing. The air may be the ambient air drawn from outside the shelter that travels through the ventilation system, for example, through the hoses, air conduits, or vents. The ventilation system may further include a fan to circulate the air. The fan may be powered by battery, solar, or electrical. Alternatively, the ventilation system further has an independent cooling system. The ambient air may enter the interior of the shelter via the door or openings or vents in the door. At least one vent remains uncovered and unencumbered by soil. Preferably, the ventilation system is located on or within the door. Alternatively, a smaller version of the shelter may be placed above ground, for example, installed in a garage.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

I claim:

1. An underground storm shelter comprising:
   a. a body having one or more connectable segments, with the segments having at least one segment being a front segment, a plurality of middle segments, and a rear segment having a downwardly tapered end,
      i. wherein the front segment being positioned transverse to a ground surface during installation, the front segment defining a raised, elongated doorway located off-center of the front segment, with the raised opening used as a threshold step into the storm shelter body, and the front segment having a slidable door;
      ii. wherein each of the middle segments comprising a floor two opposing side walls and a roof, with the floor having at least a top surface substantially contiguous with the front segment threshold step, and the floor defining a plurality of bores;
      iii. wherein the connectable segments form an interior chamber of the shelter body for holding one or more occupants in a sitting, crouching, or standing position;
   b. an anchoring means for anchoring the storm shelter to the ground surface or other structure, having at least two upwardly foldable flaps, a plurality of anchor members, and soil, with each flap defining a plurality of bores for receiving one of the plurality of anchor members after unfolding each flap, with at least one of the flaps and at least one of the plurality of anchor members each being located along each of the side walls, with the shelter floor bores each receiving one of the plurality of anchor members;
   c. wherein each of the segments being connectable to another of the segments during assembly with a fastening mechanism;
   d. wherein the soil being applied to over at least the downwardly tapered rear segment of the shelter body to aid in maintaining the location of the shelter onto the ground surface; and
   e. wherein at least one or more of the front segments, the middle segments, and the rear segments being slidably stackable into another respective front segment, middle segment, and rear segment when not in use.

2. The underground storm shelter of claim 1, the front segment further defining a channel for receiving the slidable door therein; the door further comprising a viewing member.

3. The underground storm shelter of claim 1, the storm shelter body chamber further comprising a support assembly comprising at least one removable support member, with the interior chamber defining at least one recess for receiving the support member for additional structural support of the storm shelter.

4. The underground shelter of claim 1, the door further comprising a ventilation system for providing air circulation within the interior of the storm shelter.

5. The underground storm shelter of claim 1, the fastening mechanism comprising a plurality snap seal fasteners and a plurality of clips, with the front segment having a first proximal portion having the door and a first distal portion further having a first lip circumscribing a first distal opening, each of the middle segments having a second proximal portion defining a second proximal opening and a second distal portion having a second lip circumscribing a second distal opening, and the rear segment having a third proximal portion defining a third proximal opening; wherein the first lip of the first distal portion of the front segment overlapping and engageable with the second proximal opening of one of the middle segments and one of the plurality of snap seal fasteners and at least one of a plurality of clips; and wherein the second lip of the second distal portion of one of the middle segments overlapping and engageable with the third proximal opening of the rear segment and one of the plurality of snap seal fasteners and at least one of a plurality of clips.

6. The underground storm shelter of claim 5, each of the middle segments further having a proximal portion having a height larger than the remaining of the middle segment, with the middle segment having a gradual slope for ease in slidably stacking a plurality of middle segments for storage or transport once the front segment is removed.

7. An underground storm shelter comprising:
   a. a body having
      i. a front end wall positioned transverse to a ground surface during installation, the front end wall defining a raised, elongated doorway located off-center of the front end wall, with the raised opening used as a threshold step into the storm shelter body, and the front end wall having a fastening mechanism and a slidable door with a locking mechanism, a viewing member, and a ventilation system, wherein the ventilation system provides air circulation within the storm shelter;

ii. a floor having at least a top surface substantially contiguous with the front end wall threshold step, and the floor defining a plurality of bores;

iii. two opposing side walls, wherein an upper proximal portion of the side walls having a height larger than a distal portion of the side walls;

iv. a roof;

v. a rear end wall having a downwardly tapered end;

vi. the shelter body further defining an opening at a proximal portion of the shelter body where the two side walls, the floor, and the roof join, and the shelter body further defining an interior chamber for holding one or more occupants in a sitting, crouching, or standing position; and b. an anchoring means for anchoring the storm shelter to the ground surface or other structure having at least two upwardly foldable flaps, a plurality of anchor members, and soil with each flap defining a plurality of bores for receiving one of the plurality of anchor members after unfolding each flap, with at least one of the flaps and at least one of the plurality of anchor members each being located along each of the side walls, with the shelter floor bores each receiving one of the plurality of anchor members;

c. wherein the soil being applied to over at least the downwardly tapered rear end of the shelter body to aid in maintaining the location of the shelter onto the ground surface;

d. wherein the front end wall being removably fastenable to the shelter body opening with the fastening mechanism; and e. wherein the shelter body being slidably stackable into one or more of a plurality of shelter bodies when the front end wall of each of the shelter bodies are removed.

8. The storm shelter of claim 7, the shelter body chamber further comprising a support assembly comprising at least one removable support member, with the interior chamber defining at least one recess for receiving the support member for additional structural support for the shelter.

9. The underground storm shelter of claim 7, the front end wall further defining a channel for receiving the slidable door therein.

10. The underground storm shelter of claim 7, each of the side walls further inwardly tapering for ease in insertably stacking one or more shelters.

11. The underground storm shelter of claim 7, wherein the soil is further placed over at least a rearward portion of each of the flaps, the plurality of anchor members, and approximately half-way the length of the body while leaving the front end wall unencumbered.

12. The underground storm shelter of claim 7, the fastening mechanism comprising a snap seal fastener with a distal portion of the front end wall having a lip for overlapping and engaging with the opening of the shelter body when connecting the removable front end wall to the shelter body opening.

13. The underground storm shelter of claim 7, the interior chamber further comprising at least one illumination member for selectively lighting the interior of the shelter.

\* \* \* \* \*